United States Patent [19]

Landenberger

[11] 4,440,023

[45] Apr. 3, 1984

[54] CHAIN MOTION MEASURING DEVICE

[75] Inventor: Ulric Landenberger, Mt. Clemens, Mich.

[73] Assignee: General Motors Corporation, Detroit, Mich.

[21] Appl. No.: 440,818

[22] Filed: Nov. 12, 1982

Related U.S. Application Data

[63] Continuation-in-part of Ser. No. 358,345, Mar. 15, 1982, Pat. No. 4,407,162.

[51] Int. Cl.³ .................................................. G01P 3/00
[52] U.S. Cl. ...................................... 73/490; 73/527; 198/502; 474/85
[58] Field of Search ................. 73/527, 528, 529, 490; 198/502; 474/85, 100

[56] References Cited

U.S. PATENT DOCUMENTS 2,210,154  8/1940  Stevens et al. ..................... 73/490
3,818,290  6/1974  Harper et al. ...................... 318/39

Primary Examiner—James J. Gill
Attorney, Agent, or Firm—R. L. Phillips

[57] ABSTRACT

A conveyor chain motion measuring device is disclosed having a double take-off drive coupled with closed-loop drives and one-way clutches so as to produce accurate measurement of the actual chain speed and travel for the entire length thereof regardless of chain link pitch variations and also maintain such precise measurement when the chain is temporarily reversed and then resumes travel in a forward direction.

2 Claims, 5 Drawing Figures

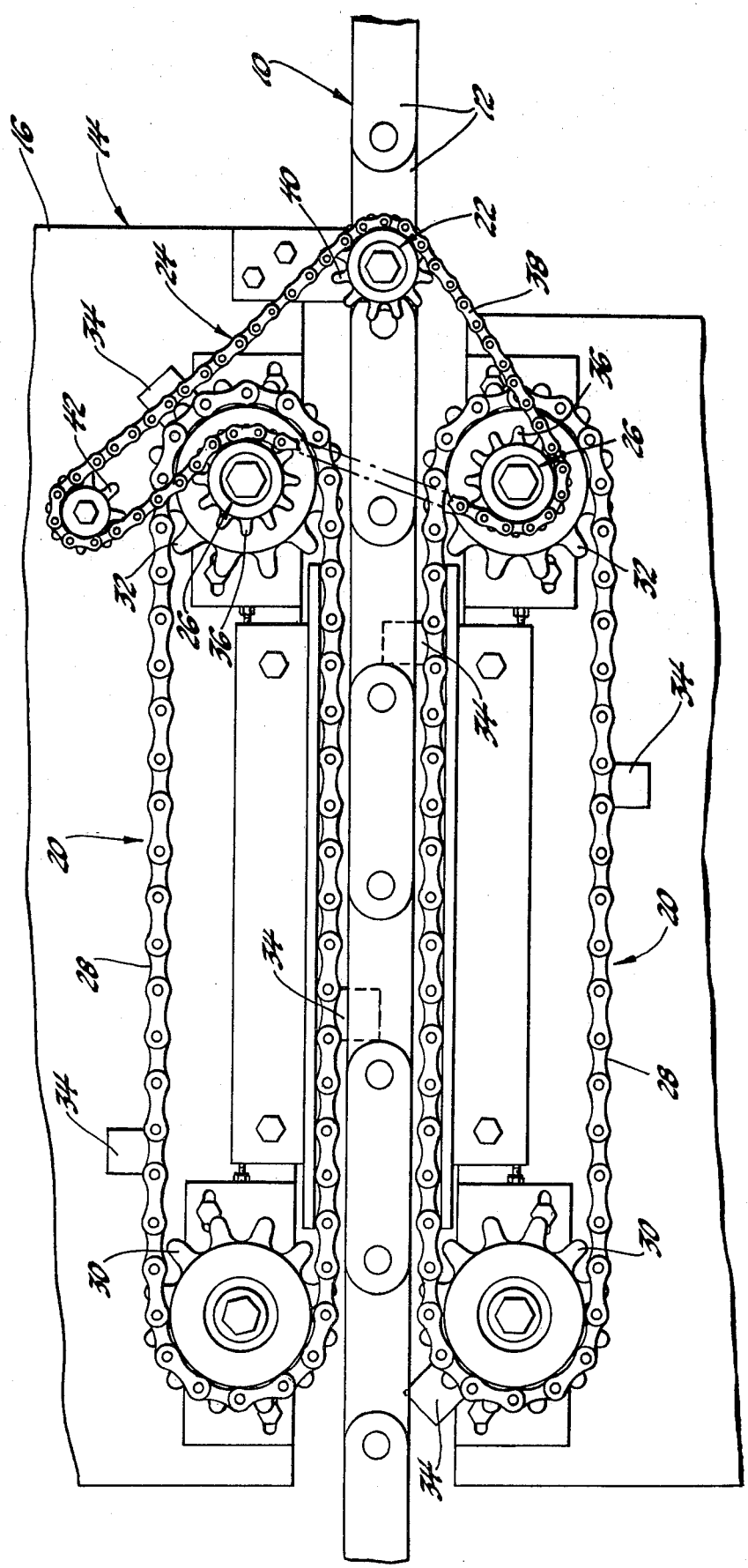

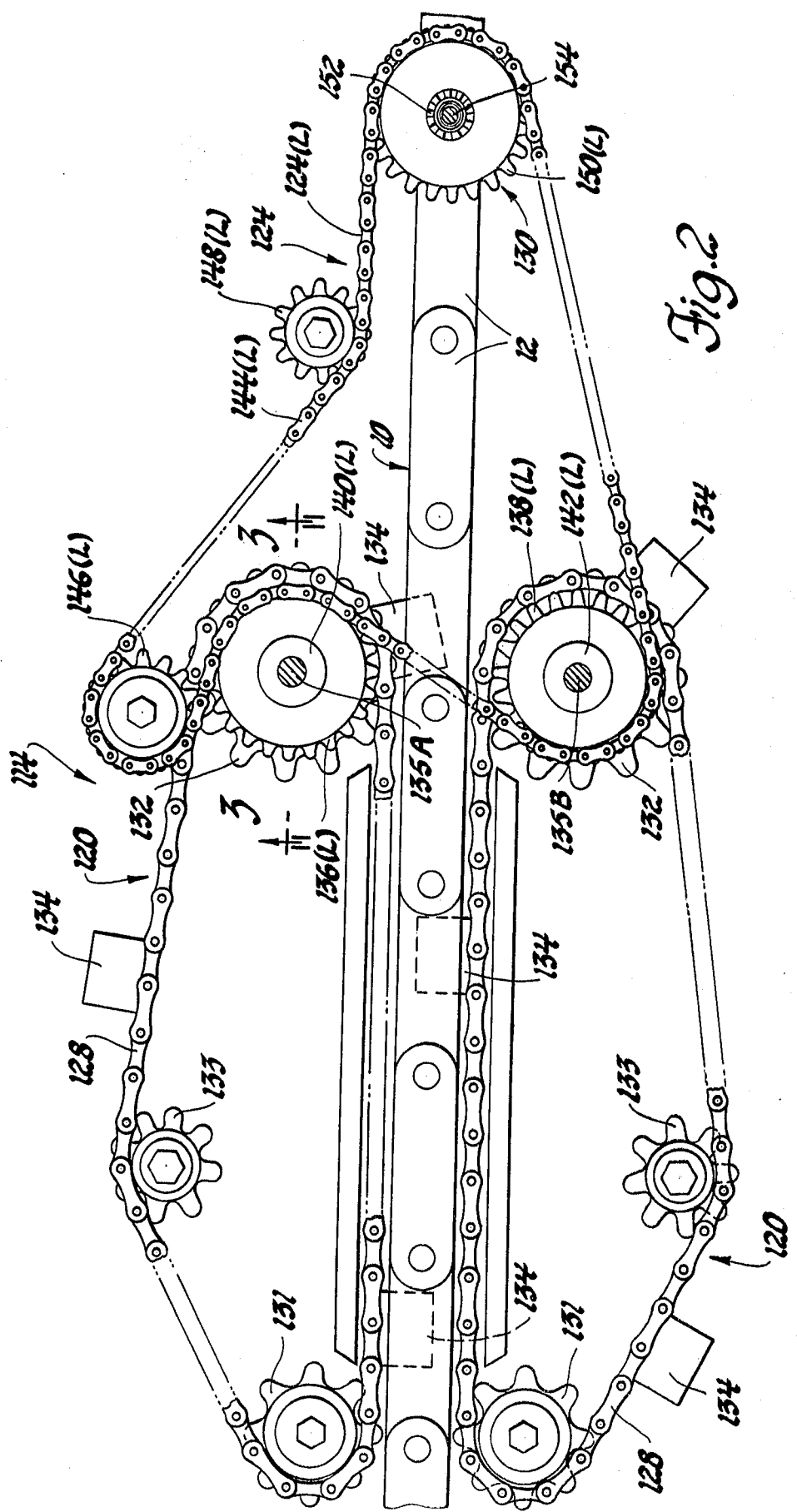

CHAIN MOTION MEASURING DEVICE

This application is a continuation-in-part of co-pending application Ser. No. 358,345 filed Mar. 15, 1982, now U.S. Pat. No. 4,407,162.

This invention relates to chain motion measuring devices and more particularly to a measuring device for precisely measuring the actual speed and travel of a chain.

Heretofore, the typical practice in measuring the motion of a chain such as used to drive an assembly line and the like to thereby measure assembly line speed and travel for monitoring thereof has been to use a measuring unit having a sprocket input directly engaged by the conveyor chain or to use a separate closed-loop drive chain which drives the measuring unit's sprocket and has lugs engaged by the conveyor chain. The former method measures the chain speed and travel by counting the chain link pitches and in practice the latter method becomes a pitch counter too. For example, in the latter method it is intended that several links on the measuring unit's drive chain will be engaged by the conveyor chain to maintain uninterrupted drive thereto but in actuality the measuring unit's drive chain is driven by a dominant conveyor chain link since the conveyor chain link pitches are not uniform. As a result, when the dominant conveyor chain link reaches the end of its engagement with the measuring unit's drive chain the drive is transferred to another conveyor chain link and so on resulting in a lag in engagement or a jump ahead in the drive to the measuring unit. The conveyor chain links are, of course, designed to be equal; however, they are typically forged parts with broad tolerances that vary and accumulate errors. Moreover, conveyor chain wear also varies and new sections of chain may be added aggravating the tolerances accumulated. As a result, both of the above prior methods are imprecise because they rely on the conveyor chain links to not only drive or input the measuring unit but also on the pitches of these links to measure the conveyor chain speed and travel. Such impreciseness is acceptable for many applications but is unacceptable for certain conveyor lines such as those that use robots which depend upon accurate measuring and monitoring of the actual speed and travel of the line to perform various programmed assembly line functions, e.g. painting vehicle body parts, manipulating parts and assemblies, etc.

The chain motion measuring device according to the present invention solves these shortcomings by eliminating tolerance accumulations or chain link pitch mismatches through use of the conveyor chain links only to drive the measuring unit while not relying on the chain link pitches for measurement. According to the present invention, there is provided a pair of closed-loop primary drives which are adapted to be engaged in staggered fashion and driven by the links of the conveyor chain so that one of the primary drives is always continuously fully engaged and driven by the conveyor chain without hesitation or jumping due to unequal conveyor chain link pitches. A separate closed-loop secondary drive is then provided which has uninterruptable drive to the measuring unit. Finally, there are provided separate overrunning drives for separately drivingly connecting the primary drives to the secondary drive which operate through relative overrunning operation to maintain a continuous drive thereto and thereby to the measuring unit from the conveyor chain through one or the other primary drives whereby the measuring unit is caused to give a true or accurate reading of the actual conveyor chain speed and travel at all times for the entire length of the conveyor chain regardless of chain link pitch variations.

It has been further discovered that such measuring accuracy can be maintained even where the conveyor chain temporarily reverses before resuming its normal forward motion. To this end, there is provided a pair of closed-loop secondary drive means and both forward and reverse overrunning drive means for separately drivingly connecting each of the primary drive means to one or the other secondary drive means depending on whether the conveyor chain is traveling forward or reverse. Differential drive means is then provided for drivingly connecting both of the secondary drive means to the measuring unit without lost motion so that the latter is caused to give a true reading of actual chain motion in both forward and reverse by the drive of one of the secondary drive means while the other remains stationary and vice versa.

These and other objects, advantages and features of the present invention will become more apparent from the following description and drawing in which:

FIG. 1 is a side elevational view of one embodiment of the chain motion measuring device according to the present invention as adapted to an automotive assembly line conveyor chain.

FIG. 2 is a side elevational view of another embodiment of the chain motion measuring device according to the present invention as adapted to an automotive assembly line conveyor chain looking in the direction of arrows 2—2 in FIG. 3.

FIG. 3 is a sectional view taken along the line 3—3 in FIG. 2.

FIG. 4 is a sectional view taken along the line 4—4 in FIG. 2a.

Figure 2A:
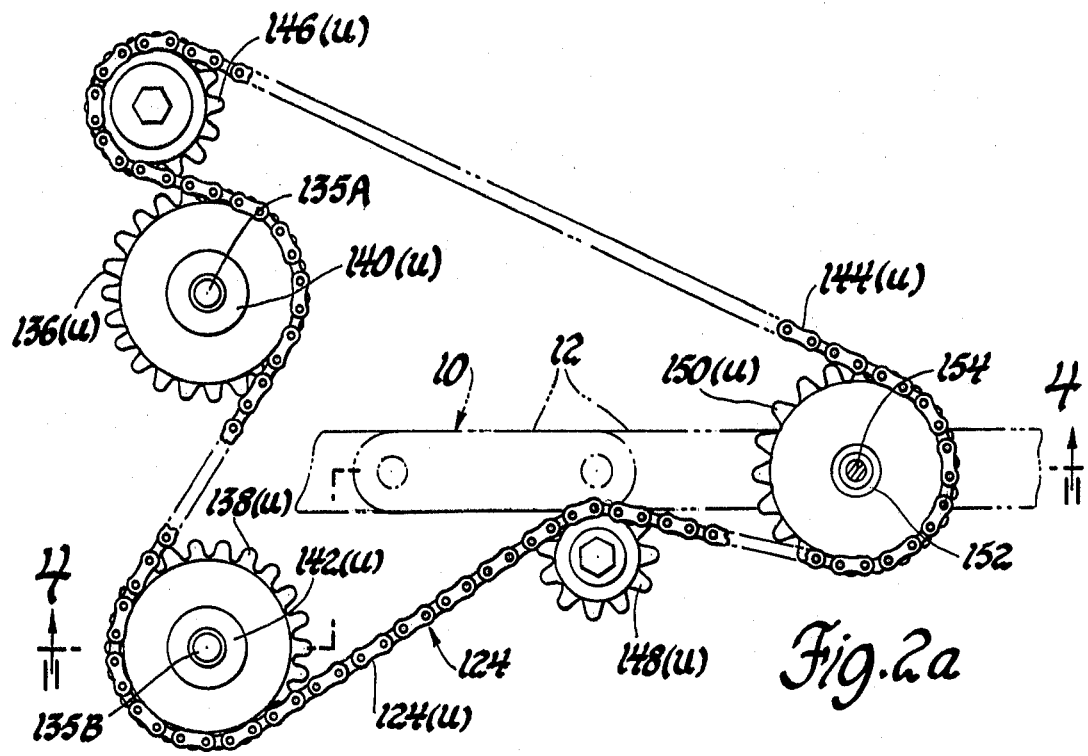
FIG. 2a is a side elevational view looking in the direction of arrows 2a—2a in FIG. 3.

Referring to FIG. 1, there is shown a section of an automotive assembly line conveyor chain 10 comprised of interconnected links 12 which form a closed loop and are driven by a motor powered sprocket (not shown). A chain motion measuring device according to the present invention and generally designated as 14 is positioned along the conveyor chain 10 and is operable to accurately measure the actual speed and travel thereof and thus that of the assembly line which the conveyor chain drives. The chain motion measuring device 14 generally comprises a frame 16 on which are mounted (A) a pair of separate but identical closed-loop primary drive means 20 which are adapted to be engaged in staggered fashion and driven by the conveyor chain links 12, (B) measuring means 22, (C) closed-loop secondary drive means 24 for uninterruptedly driving the measuring means 22, and (D) a pair of separate but identical overrunning drive means 26 for separately drivingly connecting the two primary drive means 20 to the secondary drive means 24 so as to maintain a continuous drive thereto and thereby from the conveyor chain 10 to the measuring means 22.

Describing now the details, the two primary drive means 20 are located on opposite sides of the conveyor chain 10 and each comprise an endless or closed-loop chain 28 engaging a pair of spaced apart sprockets 30 and 32 which are rotatably mounted on the frame 16. The sprockets 30 and 32 are positioned so that the straight lengths of the chain 28 between its sprockets run parallel to the conveyor chain 10 and with one of the straight chain lengths adjacent thereto. Each of the primary drive chains 28 has three lug attachments 34 which are equally spaced along the length thereof and fixed thereto. The lug attachments 34 on one primary drive chain 28 are staggered with respect to those on the other primary drive chain so that the lugs on the two primary drive chains are alternately engaged by the links 12 of the conveyor chain 10 as shown. By this arrangement, at least one of the lug attachments 34 on one of the primary drive chains 28 is always fully engaged and being driven by the conveyor chain 10 without hesitations or jumps due to mismatched pitches in the conveyor chain.

The thus driven primary drive chain sprockets 32 are operably drivingly connected by the respective overrunning drive means 26 to drive identical sprockets 36 which are mounted coaxially therewith and form part of the closed-loop secondary drive means 24. In the closed-loop secondary drive means 24, the sprockets 36 engage the opposite sides of an endless or closed-loop drive chain 38 which extends across one side of the conveyor chain path and which in addition to engaging a sprocket 40 driving the measuring means 22 also engages a tensioning sprocket 42 that is rotatably mounted on the frame 16 and operates to always maintain tension in the chain 38.

In the preferred embodiment, the measuring means 22 is simply a conventional counting mechanism and the overrunning drive means 26 are simply conventional overrunning clutches.

With such arrangement and the conveyor chain 10 in motion, there will always be at least one of the lugs 34 on one of the primary drive chains 28 fully engaged by a conveyor chain link 12 with the result that one of the primary drive loops 20 is always driven by the conveyor chain 10 without hesitations or jumps due to nonuniform or mismatched pitches in the links 12 of the conveyor chain. The primary drive loops 20 in turn drive the secondary drive loop 24 through the overrunning clutches 26 which through relative over-running operation act to accommodate engagement and disengagement fluctuations due to variations in the conveyor chain link pitch. For example, when there is a conveyor chain pitch variation, one of the primary drive loops 20 will dominate and drive the secondary drive loop 24 through its overrunning clutch 26 while the other primary drive loop is then in a momentary pause condition wherein its clutch drive to the secondary drive loop is overrun. Thus, there is maintained a continuous or uninterrupted drive from the conveyor chain 10 to the secondary drive loop 24 through the interaction of the two primary loops 20 at their overrunning clutches 26. Then in the secondary drive loop 24, the tensioning sprocket 42 maintains continuous tension in the chain 38 so as to maintain a continuous drive therein to the counter unit 22 which as a result, is caused to give a true reading of actual chain speed and travel at all times for the entire length of the chain regardless of conveyor chain link pitch variation.

While the measuring device's two primary drive loops 20 are shown as being on opposite sides of the conveyor chain 10, it will be appreciated that they may also be installed in tandem on one side of the conveyor chain. Moreover, it will be appreciated that the measuring device may be placed anywhere along the length of conveyor chain without affecting its accuracy.

Figures 3, 4:
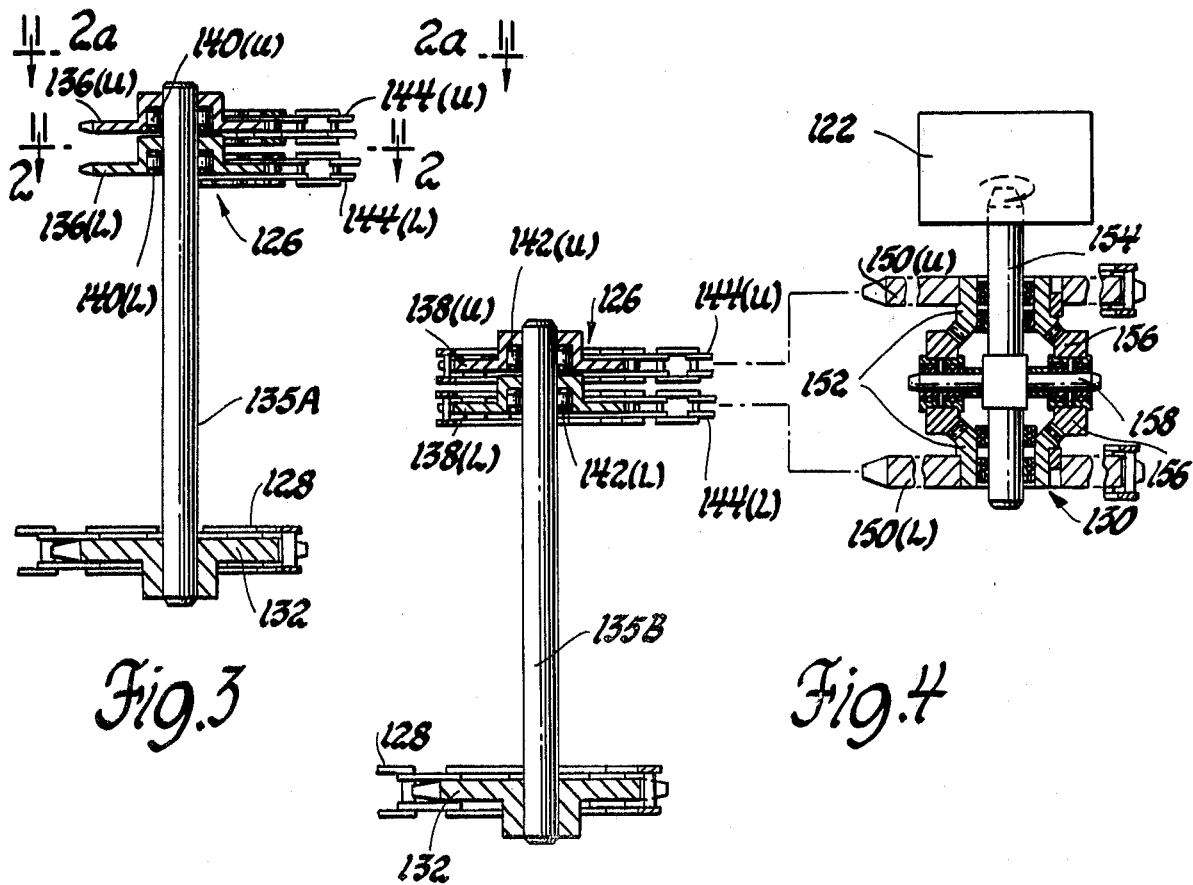

The above embodiment it will be seen remains accurate so long as there is no temporary conveyor chain reversal before resumption of the normal forward motion. However, by simple modification, the measuring device can be made reversible as shown by the embodiment 114 in FIGS. 2, 2a, 3 and 4. Again, there are employed a pair of separate but identical closed-loop primary drive means 120 which are adapted to be engaged in staggered fashion and driven by the links 12 of the conveyor chain 10. However, drive to a measuring unit 122 (see FIG. 4) is now provided by a pair of separate but identical closed-loop secondary drive means 124 (see FIGS. 2 and 2a) which are separately drivingly connected to the two primary drive means by separate but identical pairs of overrunning drive means 126 (see FIGS. 3 and 4). The two secondary drive means 124 are then connected without lost motion to the measuring unit 122 by differential drive means 130 as shown in FIG. 4.

The two primary drive means 120 which will now be referred to as forward-reverse primary drive means or loops because of their extended function are located as before on opposite sides (top and bottom) of the conveyor chain 10 as shown in FIG. 2. Each of the forward-reverse primary drive means 120 comprises an endless chain 128 engaging a pair of spaced apart sprockets 131 and 132 and also a tension idler sprocket 133. The sprockets 131 and 132 are positioned so that the straight length of chain 128 therebetween opposite the idler 133 runs parallel to the conveyor chain 10. Each of the forward-reverse primary drive chains 128 has three lugs 134 which are equally spaced along the length thereof and fixed thereto. The lugs 134 on one forward-reverse primary drive chain 128 are staggered with respect to those on the other forward-reverse primary drive chain so that the lugs on these two chains are engaged in an alternate manner by the conveyor chain links 12. Thus, the forward-reverse primary loops 120 like in the previous embodiment maintain a constant engagement and accurately register the linear travel of the conveyor chain 10 as the resultant of the two primary loops.

The forward-reverse primary loops 120 in turn drive the secondary drive means or loops 124 which for purposes of clarity will hereinafter be referred to together with their parts as upper or lower level and identified with the suffixes (U) and (L) respectively. In the drive to the secondary loops, the two primary sprockets 132 are fixed to separate shafts 135A and 135B which are connected in turn to drive a pair of sprockets 136(L), 136(U),(see FIG. 3) and 138(L), 138(U) (see FIG. 4) respectively by the overrunning drive means 126 which for the lower and upper levels comprises a pair of one-way clutches 140(L), 140(U) (see FIG. 3) and 142(L), 142(U) (see FIG. 4) arranged with the respective secondary input shafts and sprockets. In the lower level secondary loop, 124(L) as shown in FIG. 2, the sprockets 136(L) and 138(L) engage the opposite sides of an endless chain 144(L) which in addition engages with a wrap idler sprocket 146(L), tension idler sprocket 148(L) and an output sprocket 150(L). In like manner, the sprockets 136(U) and 138(U) in the upper level secondary loop 124(U) as shown in FIG. 2a, engage an endless chain 144(U) which also engages with a wrap idler sprocket 146(U), tension idler sprocket 148(U) and output sprocket 150(U).

The one-way clutches are installed in a directional sense so that when the conveyor chain is traveling from right to left which may be either forward or reverse, only the clutches 140(L) and 142(L) engage whichever shaft 135A or 135B is then being driven by its respective primary loop and in turn drive the lower level secondary loop 124(L) in a counter-clockwise direction. Since the one-way clutches 140(U) and 142(U) do not engage when the conveyor chain is traveling right to left, the upper level secondary loop 124(U) remains stationary. Alternatively, when the conveyor chain travels from left to right the one-way clutches 140(U) and 142(U) now engage whichever shaft 135A or 135B is then being driven by its respective primary loop and in turn drive the upper level secondary loop 124(U) in a clockwise direction while the one-way clutches 140(L) and 142(L) remain disengaged and the lower level secondary loop 124(L) thus remains stationary.

At the differential 130, as shown in FIG. 4, the sprockets 150(U) and 150(L) in the upper and lower level secondary loops are connected to end bevel gears 152 which are mounted so as to rotate freely on the differential's spider shaft 154. The end bevel gears 152 mesh with side bevel gears 156 that are mounted to rotate freely on a cross-shaft or spider 158 connected to the spider shaft 154 which in turn is connected directly to the measuring unit 122.

Thus, when either the upper or lower secondary loop is driving and the other is stationary, the thus driven sprocket 150(U) or 150(L) will drive the end bevel gear 152 connected thereto while the other end bevel gear 152 remains stationary. The differential shown is a miter one with a 1:1 ratio and as a result the thus driven side gears 156 rotate the spider shaft 154 and thereby input the measuring unit 122 at half the speed and in the same direction as the driving sprocket 150(U) or 150(L). The differential can be readily made to operate with no lost motion so that the only backlash is the gap between the engagement lugs 134 and the spacing between the chain links 12. However, this backlash is not critical since the error in travel reading when the conveyor chain reverses is canceled when the conveyor chain travels forward again in its normal direction. It will also be understood that while a 1:1 ratio or miter differential is preferred, other ratios and types of differentials such as planetary and internal gear could be used.

The above described embodiments are illustrative of the invention which may be modified within the scope of the appended claims.

The embodiments of the invention in which an exclusive property or privilege is claimed are defined as follows:

1. A chain motion measuring device for maintaining precise measurement of the motion of a chain formed of interconnected links when the chain is temporarily reversed and then resumes travel in a forward direction, said device comprising a pair of closed-loop forward-reverse primary drive means adapted to be engaged in staggered fashion and driven by the chain links whereby one of said primary drive means is always fully engaged and driven by the chain and in a direction dependent on that of the chain, closed-loop forward secondary drive means, separate forward overrunning drive means for separately drivingly connecting each of said primary drive means to said forward secondary drive means only when the chain is traveling forward whereby said forward secondary drive means is driven in a forward measuring direction without interruption by one of said foward overrunning drive means overrunning the other, closed-loop reverse secondary drive means, separate reverse overrunning drive means for separately drivingly connecting each of said primary drive means to said reverse secondary drive means only when the chain is traveling in reverse whereby said reverse secondary drive means is driVen in a reverse measuring direction without interruption by one of said reverse overrunning drive means overrunning the other, and differential drive means for drivingly connecting said forward secondary drive means and said reverse secondary drive means to said measuring means without lost motion whereby said measuring means is caused to give a true reading of actual chain motion in both the forward and reverse directions by the drive of said forward secondary drive means while said reverse secondary drive means remains stationary and vice versa respectively.

2. A chain motion measuring device for maintaining precise measurement of the motion of a chain formed of interconnected links when the chain is temporarily reversed and then resumes travel in a forward direction, said device comprising a pair of closed-loop forward-reverse primary drive means adapted to be engaged in staggered fashion and driven by the chain links whereby one of said primary drive means is always fully engaged and driven by the chain and in a direction dependent on that of the chain, closed-loop forward secondary drive means, separate forward one-way clutches for separately drivingly connecting each of said primary driving means to said forward secondary drive means only when the chain is traveling forward whereby said forward secondary drive means is driven in a forward measuring direction without interruption by alternate operation of said forward one-way clutches, closed-loop reverse secondary drive means, separate reverse one-way clutches for separately drivingly connecting each of said primary drive means to said reverse secondary drive means only when the chain is traveling in reverse whereby said reverse secondary drive means is driven in a reverse measuring direction without interruption by alternate operation of said reverse one-way clutches, overrunning the other, and differential drive means for drivingly connecting said forward secondary drive means and said reverse secondary drive means to said measuring means without lost motion whereby said measuring means is caused to give a true reading of actual chain motion in both the forward and reverse directions by the drive of said forward secondary drive means while said reverse secondary drive means remains stationary and vice versa respectively.

* * * * *